United States Patent [19]

Austin

[11] 4,305,613
[45] Dec. 15, 1981

[54] MICROWAVE UTENSIL HANDLE

[75] Inventor: Buddy J. Austin, Atkins, Iowa

[73] Assignee: Amana Refrigeration, Inc., Amana, Iowa

[21] Appl. No.: 148,927

[22] Filed: May 12, 1980

[51] Int. Cl.³ .............................................. A47J 45/07
[52] U.S. Cl. .................................................... 294/31.2
[58] Field of Search ................... 294/31.2, 27 H, 27 R; 16/110, 114 R, DIG. 25; 81/43; 215/100 A; 224/51, 55, 58; 248/315; 219/10.55 E

[56] References Cited

U.S. PATENT DOCUMENTS

| 2,474,913 | 7/1949 | Propst | 294/31.2 |
| 3,974,354 | 8/1976 | Long | 219/10.55 E |
| 4,058,338 | 11/1977 | Brown | 294/31.2 |
| 4,158,464 | 6/1979 | Bowen et al. | 294/31.2 |

Primary Examiner—James B. Marbert
Attorney, Agent, or Firm—Robert W. Hoke, II

[57] ABSTRACT

A utensil handle assembly for a utensil suitable for use in a microwave oven combining the advantages of metal with the advantages of plastic. A split metal ring is tightly drawn around the utensil and fastened together. A plastic handle is connected to the already fastened metal ring through a connecting area. The connecting area is made up of a series of wedges pressed together and bonded to form a permanent connection.

6 Claims, 4 Drawing Figures

MICROWAVE UTENSIL HANDLE

BACKGROUND OF THE INVENTION

The invention relates to utensil handles generally and more particularly to a utensil handle assembly partially constructed of metal and adapted for use in a microwave oven.

Utensil handles designed for use in a microwave oven are well-known in the art. Numerous microwave utensils have appeared on the market and are available to the consumer at the retail level. In addition, several U.S. Patents have issued disclosing various forms of these handles. For example, U.S. Pat. No. 3,974,354 discloses a microwave utensil handle with reflective surfaces for reflecting microwave energy away from the handle to prevent heat build up in the handle. U.S. Pat. No. 4,158,464 discloses an all-plastic utensil handle for use in a microwave oven. Both references attempt to provide a handle suitable for use in a microwave oven that will not heat up excessively during the cooking process.

It is generally accepted that metal objects should not be placed in a microwave oven for the reason the metal will absorb some of the microwave energy and consequently become heated and will simultaneously reflect some of the microwave energy in a manner which could cause damage to parts of the oven. The amount of absorption and reflection is dependent upon the kind of metal and its conductivity. For example, metal screws or threads or sharp corners may become focal points for the microwave energy with resultant arcing of the energy between metal parts. This undesirable arcing may cause excessive heating and damage to the parts. Thus, utensil handles in the past have avoided the use of metal when designed for use in a microwave environment.

SUMMARY OF THE INVENTION

According to the invention, there is provided an improved utensil handle designed for use in a microwave oven and constructed partially of metal to support the utensil without the undesirable side effects of becoming itself heated in a portion that may come in contact with the user and will at the same time not act as a focal point with resultant arcing between metal parts.

The primary object of the invention is to provide an improved utensil handle for use in a microwave oven that combines the strength of metal with the coolness of a plastic handle.

Another object of the invention is to provide a metal handle for a microwave utensil that will not heat up in portions that may come in direct contact with the user.

A further object is to provide a microwave utensil handle partially constructed of metal without the use of metal screws or other pointed metal portions.

Another object is to provide a utensil handle adaptable to a wide variation of utensil diameters to accommodate the production tolerances associated with low cost, mass produced utensils.

Other objects and advantages of the invention will become apparent from the following description, the accompanying drawings and the appended claims.

DESCRIPTION OF THE PREFERRED EMBODIMENT

Figure 1:
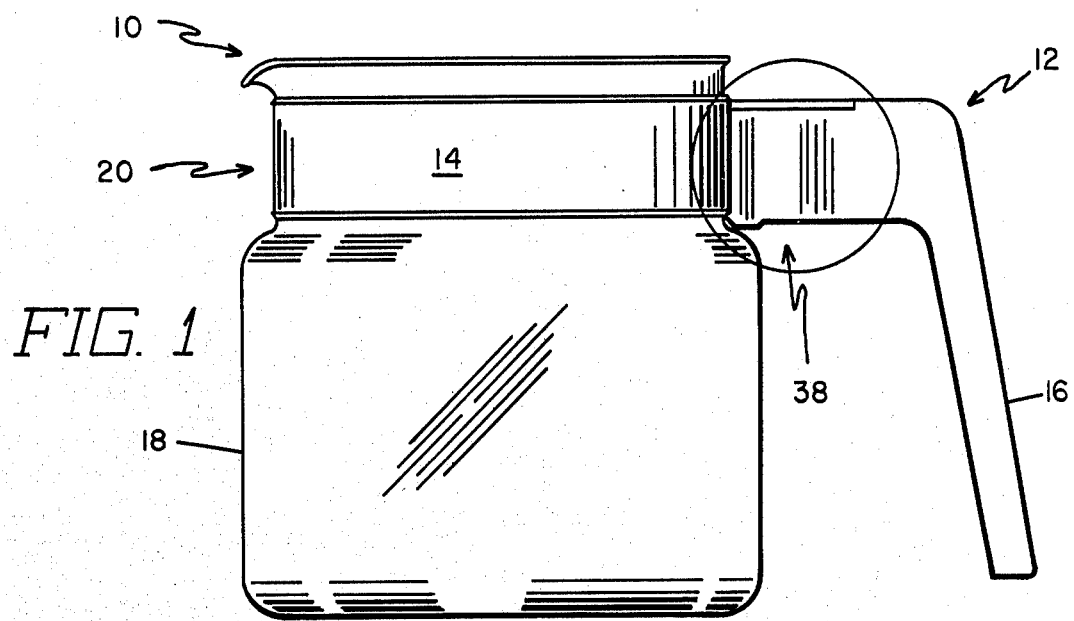
FIG. 1 is a side view of a microwave utensil and utensil handle assembly.

Referring to the drawings wherein like reference characters designate like parts throughout the several views, a microwave utensil 10 is shown with a handle assembly 12 comprised of a supporting ring 14 and a handle 16. The utensil 10 may be any suitable vessel, pot, pan or other container. It is illustrated as a coffeepot having a body portion 18 and a narrower neck portion 20. The utensil 10 may be made of glass, plastic or ceramic material which demonstrates a low dielectric loss at microwave frequencies, thus making it readily transparent to microwaves.

Figure 2:
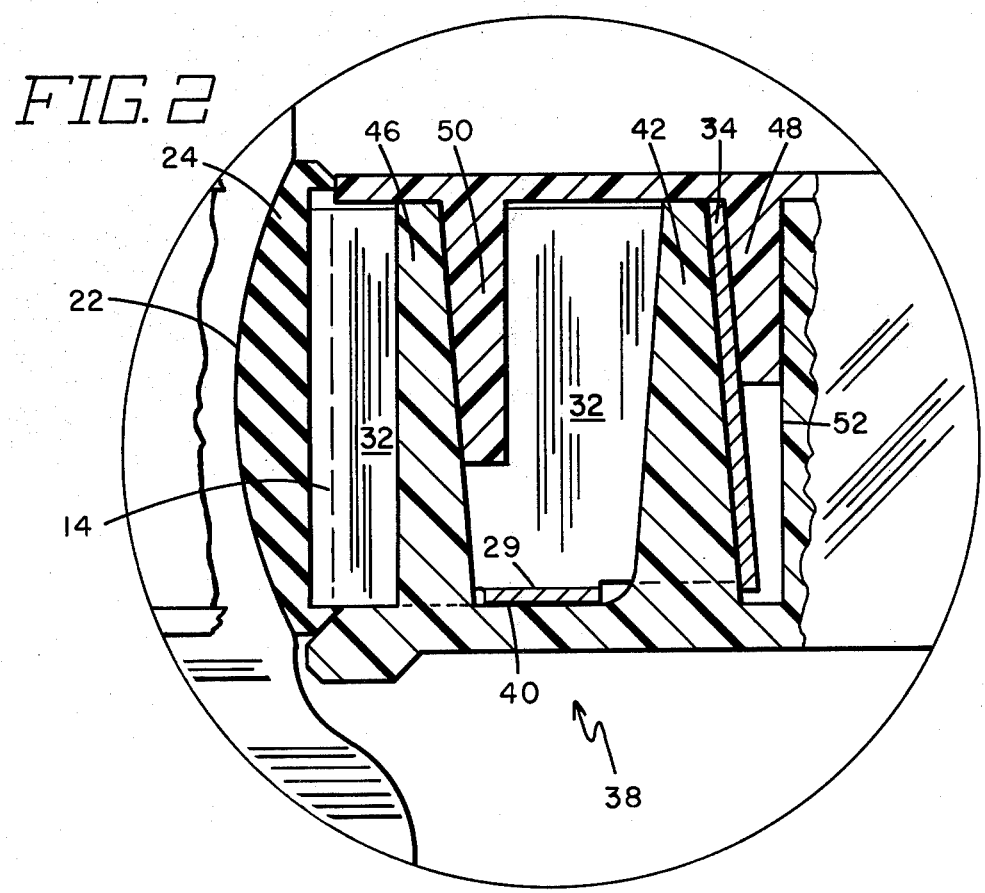
FIG. 2 is a partial sectional view of the side of the utensil handle assembly of FIG. 1 with portions broken away.

As shown in FIG. 2, neck portion 20 is provided with a groove 22 in which is located a compressible ring 24 formed of silicon rubber or similarly resilient material which is also of low dielectric loss at microwave frequencies. Mounted over the compressible ring 24 is the supporting ring 14. Ring 14 is formed as a split ring with end portions 26 adapted to be located closely together when ring 14 is mounted on utensil 10 as most clearly seen in FIG. 3 and FIG. 4. The ring 14 is made of a suitable metal that will not absorb excessive amounts of energy when subjected to a microwave environment. One such metal is type 304 bright annealed stainless steel of approximately 0.031 inches thickness. Some flexibility exists in the ring 14 which enables it to be expanded sufficiently to be slipped over the top of the utensil 10 and slid down to the desired position over the compressible ring 24. Once the ring 14 has been properly positioned, it may be drawn tightly against the compressible ring 24 and held in that position by spot welding or otherwise conductively connecting tabs 29 formed from ring 14 to prevent arcing between the tabs 29. The compressible ring 24 and metal ring 14 with tabs 29 are thus able to adapt to an assembled handle and utensil structure with the wide variations in dimensional tolerances which may occur from utensil to utensil. Depending upon the exact circumference of the utensil 10 to be banded, the amount of overlap of the tabs 29 will vary, but the pressure exerted on the utensil 10 will remain constant. This, in turn, reduces the likelihood of slippage between the utensil 10 and the handle assembly 12. The compressible ring 24 may have any desired outer surface configuration compatible with a suitable metal supporting ring 14.

To enable the handle 16 to be attached to the support ring 14, the end portions 26 of ring 14 are formed with parallel outwardly radially extending and adjacent arms 32. Each arm 32 is formed into a flange 34 as well as a tab 29. Thus, once the tabs 29 have been welded or otherwise conncected, the flanges 34 form hooks to support the handle 16 as will be described.

The handle 16 which is preferably made of a low dielectric loss material such as polycarbonate or polysulfone may be slipped on to the end portions 26 from below in the manner shown in FIG. 1 and FIG. 2. Once the handle 16 has been slid into position, the assembly is completed by wedging a polycarbonate or polysulfone handle cap 36 into the area of the tabs 29 and the handle 16 as shown in FIG. 2 and subsequently sonic welding or otherwise securing the handle cap 36 in position as shown in FIG. 1 and 2. The cap 36 may also be cemented, solvent bonded or otherwise securely held in position.

Figure 3:
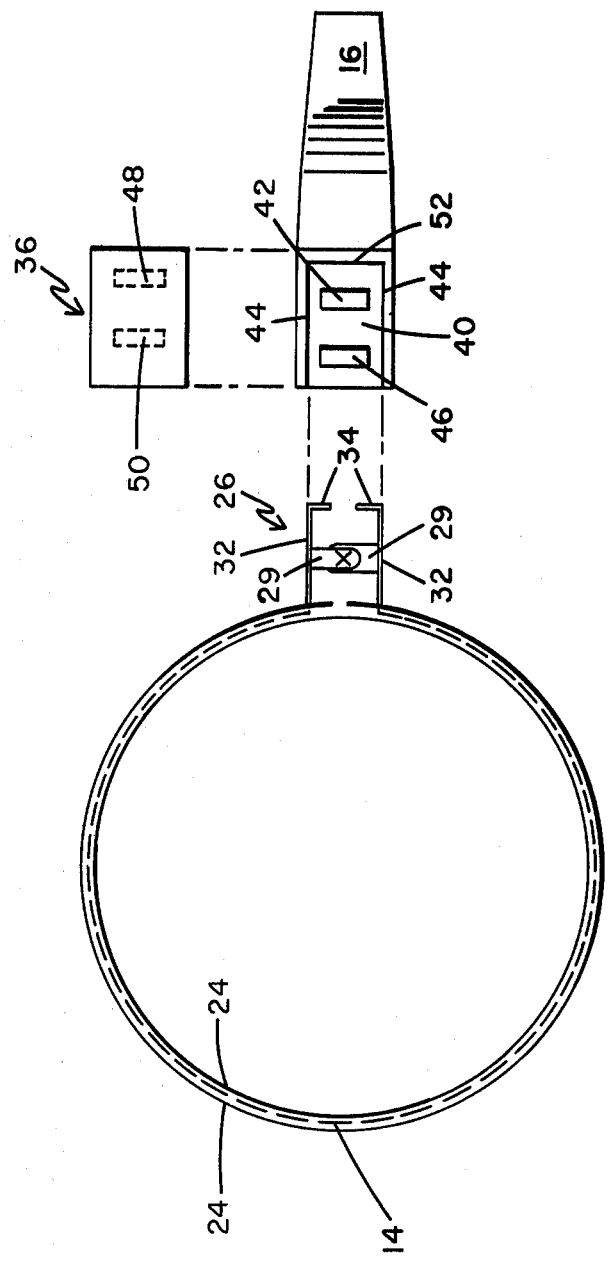
FIG. 3 is a top view of the partially disassembled utensil handle assembly of FIG. 1.
Figure 4:
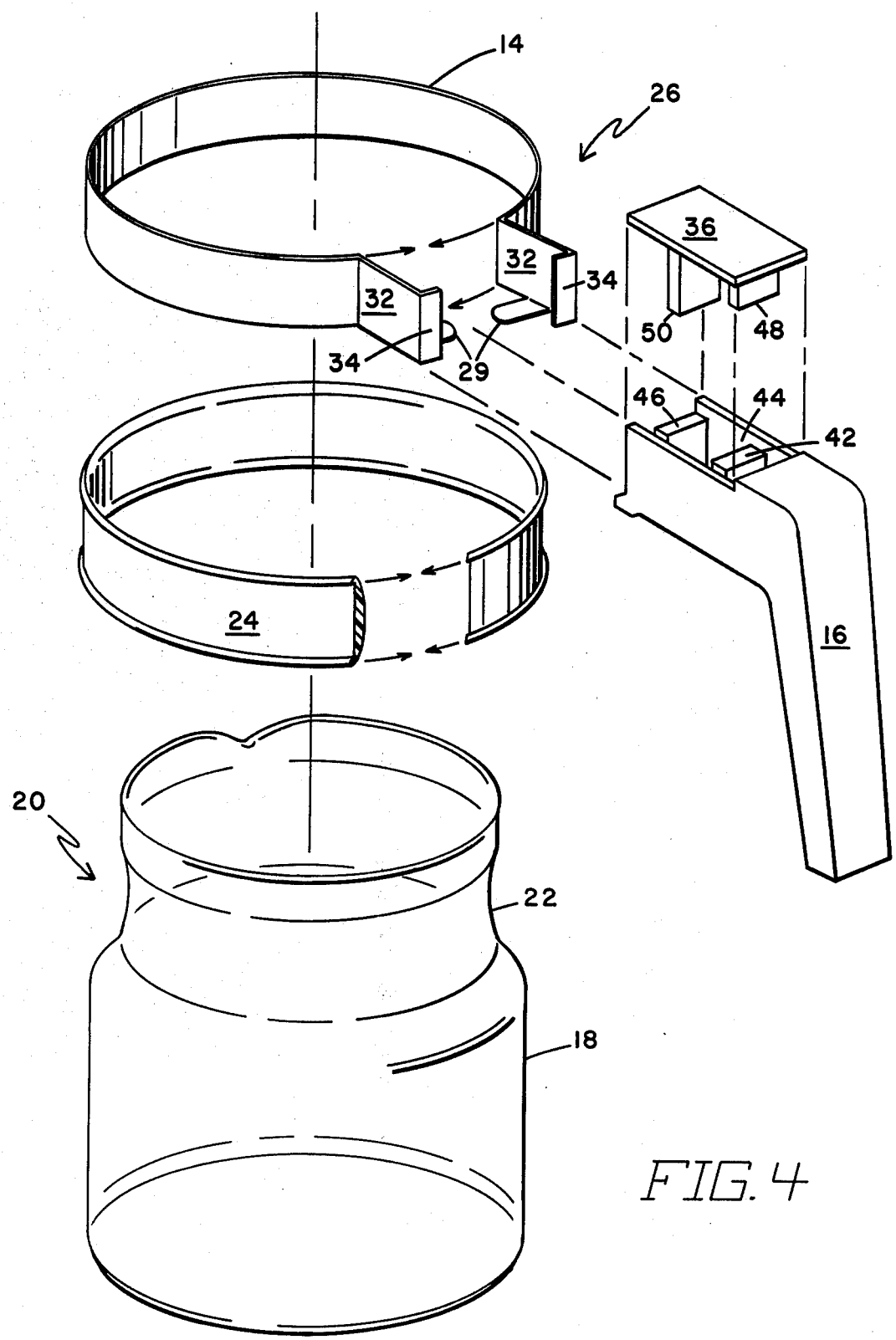
FIG. 4 is an exploded, elevated perspective view of the disassembled utensil band of FIG. 1.

As may be more readily seen in FIG. 2 and FIG. 3, the handle 16 is provided with a connecting portion 38 which is particularly adapted to the tabs 29, arms 32 and flanges 34 of ring 14 to be supported by and to support the end portions 26 of ring 14. More particularly, when handle 16 is pressed into position, a bottom portion 40 of handle 16 abuts welded tabs 29, a first spike portion 42 of handle 16 abuts flanges 34, side portions 44 contact arms 32 and a second spike portion 46 is located adjacent to tabs 29 to further prevent mislocation of the handle 16 on the ring 14. Once the handle 16 is so positioned, the handle cap 36, comprised of cap wedges 48 and 50, is pressed into the connecting portion 38 of handle 16 to prevent mislocation of the parts and to provide additional surface for sonic welding, cementing, thermal welding or solvent bonding the pieces together for a permanently bonded handle assembly 12. Wedge 48 is pressed between flanges 34 and wall 52. Wedge 50 is pressed against wedge 46. Wedge 48 may in addition contact side portions 44 to provide additional surface area for bonding the parts together.

From the foregoing, it is apparent that all the objectives of this invention have been achieved by the handle assembly as shown and described. It is to be understood that various modifications and changes in the structure shown and described may be made by those skilled in the art without the parting from the spirit of the invention as expressed in the accompanying claims. Therefore, all matters shown and described are to be interpreted as illustrative and not in a limiting sense.

What is claimed is:

1. A handle assembly mountable on a utensil and comprising a split ring positionable about a portion of the utensil, a handle engageable with said ring, and securing means for affixing said handle to said ring; said ring terminating in opposed end portions, each end portion including an arm projecting radially outward from said ring, the arm of each end portion generally paralleling the arm of the other end portion, each arm terminating in an end flange laterally directed toward the other of said arms, the end flange of each arm generally aligning with the end flange of the other arm; said handle including a connecting portion for selective engagement with the end portions of said ring, said connecting portion including opposed side portions, a bottom portion extending between said side portions, and a spike portion extending upward from said bottom portion between and in spaced relation to said side portions, said connecting portion, when selectively engaged with the end portions of the ring, having said side portions positioned laterally of and in engagement with said arms, said bottom portion positioned in underlying engagement with said end portions, and said spike portion positioned radially inward of and in engagement with said arm flanges; said securing means including a handle cap positionable in overlying relation to said ring end portions and said connecting portion, and affixable to said connecting portion for confining said ring end portions therebetween.

2. The handle assembly of claim 1 wherein said handle cap includes a depending wedge positionable radially outward of said arm flanges for selective engagement with said arm flanges on the opposed side thereof from said spike portion.

3. The handle assembly of claim 2 wherein said connecting portion includes an upstanding wall positionable radially outward of said spike portion, said depending wedge being selectively engageable between said arm flanges and said upstanding wall.

4. The handle assembly of claim 3 wherein said end portions include a laterally projecting tab integral with each arm radially inward of the end flanges, said tabs being inwardly directed toward each other for selective engagement upon a positioning of the split ring about a utensil.

5. The handle assembly of claim 4 including a second spike portion extending upwardly from said bottom portion between and in spaced relation to said side portions for positioning between said arms and radially inward of said tabs.

6. The handle assembly of claim 5 including a second depending wedge on said handle cap positionable radially outward of and in engagement with said second spike portion upon a positioning of said handle cap in overlying relation to said ring end portions and said connection portion.

* * * * *